(12) United States Patent
Gleim et al.

(10) Patent No.: US 6,704,064 B1
(45) Date of Patent: Mar. 9, 2004

(54) METHOD AND APPARATUS FOR CONVERGENCE CORRECTION IN A TELEVISION RECEIVER

(75) Inventors: Günter Gleim, Villingen-Schwenningen (DE); Bernd Rekla, Villingen-Schwenningen (DE)

(73) Assignee: Thomson Licensing S. A., Boulogne (FR)

( * ) Notice: Subject to any disclaimer, the term of this patent is extended or adjusted under 35 U.S.C. 154(b) by 0 days.

(21) Appl. No.: 09/762,404

(22) PCT Filed: Jul. 30, 1999

(86) PCT No.: PCT/EP99/05450
§ 371 (c)(1),
(2), (4) Date: Feb. 7, 2001

(87) PCT Pub. No.: WO00/08863
PCT Pub. Date: Feb. 17, 2000

(30) Foreign Application Priority Data

Aug. 7, 1998 (DE) .......................................... 198 35 803

(51) Int. Cl.[7] .............................................. H04N 9/28
(52) U.S. Cl. ...................................... 348/807; 348/745
(58) Field of Search .............................. 348/806, 807, 348/745, 189, 190; 315/368.11, 368.15, 368.18, 368.24, 368.28

(56) References Cited

U.S. PATENT DOCUMENTS

| | | | |
|---|---|---|---|
| 4,823,188 A | * | 4/1989 | Fauquet et al. ............... 358/51 |
| 4,871,948 A | | 10/1989 | Nelson ........................ 315/368 |
| 4,999,703 A | | 3/1991 | Henderson .................... 358/60 |
| 5,231,481 A | * | 7/1993 | Eouzan et al. ................. 358/60 |
| 5,345,262 A | * | 9/1994 | Yee et al. .................... 348/177 |
| 5,497,054 A | * | 3/1996 | Ryu ....................... 315/368.11 |
| 5,521,646 A | | 5/1996 | de Paul Humeau et al. 348/744 |

FOREIGN PATENT DOCUMENTS

EP  752 790 A2  1/1997  ............ H04N/9/28

\* cited by examiner

*Primary Examiner*—Victor R. Kostak
(74) *Attorney, Agent, or Firm*—Joseph S. Tripoli; Harvey D. Fried; Francis A. Davenport

(57) ABSTRACT

A convergence method for color television receiver comprises the steps of emitting a test signal from a control circuit to a first convergence channel to generate a current of a predetermined intensity in a convergence coil assigned thereto. The control circuit emitting a zero signal to the other convergence channels to generate zero current in the assigned convergence coils. Measuring and comparing with a reference potential a potential at a reference point of each convergence coil of channels driven by the zero signal. Generating a reference signal responsive to the comparison step b), for each case for the relevant convergence channel and coupling to the control circuit. Repeating steps a) to c) for each convergence channel, the convergence channels being driven in an alternating fashion one after another once in each case by a test signal.

14 Claims, 3 Drawing Sheets

METHOD AND APPARATUS FOR CONVERGENCE CORRECTION IN A TELEVISION RECEIVER

This application claims the benefit under 35 U.S.C. § 365 of International Application PCT/EP99/05450 filed Jul. 30, 1999, which claims the benefit of German Application No. 198 35 803.2, filed Aug. 7, 1998.

The invention relates to a method and an apparatus for convergence correction in a television receiver, in particular in a projection colour television receiver.

Convergence correction devices serve to correct parameters in the raster deflection, for example the correction of north/south and east/west distortions, of pin-cushion distortion, of non-linearities in the deflection and other geometric errors in the horizontal or vertical direction. A particular field of application is convergence correction in the case of a projection television receiver, in which the pictures of three monochromatic picture tubes are projected onto a picture area. Here, television receiver is taken to mean any device with electronic, rasterized picture reproduction. The receiver can be fed by a television broadcast signal or also, as a pure monitor, by a RGB signal, an FBAS signal or, separately, with a luminance signal and a colour subcarrier from an arbitrary video signal source.

The correction of the deflection parameters is undertaken with the aid of digital correction values which are stored in a convergence circuit. The stored correction values are converted in a digital/analogue converter into an analogue control signal and emitted to the first input of an output amplifier whose output is connected to the first terminal of the respectively assigned convergence coil. The second terminal of the convergence coil is connected, on the one hand, to frame potential via a measuring shunt and, on the other hand, to the second input of the output amplifier via a feedback loop. It is ensured in this way that a current corresponding to the analogue control signal is impressed on the convergence coil. Series resistances, for example due to the resistance of conductor tracks, can have the effect that the measuring shunt is no longer at frame potential, but at a potential differing therefrom. The effect of this is that the current in the convergence coil no longer corresponds exactly to the convergence correction value, but deviates from the desired value.

SUMMARY OF THE INVENTION

Starting from here, it is the object of the invention to specify a method in which the difficulties described at the beginning and their effects no longer occur in a troublesome fashion.

An advantage of the method according to the invention is that the crosstalk of one convergence channel onto the other convergence channels is compensated by a simple electrical measurement. It is possible in this way for the convergence, for example in a projection television receiver, to be balanced substantially more accurately and quickly, and this leads, on the one hand, to an improved picture quality and, on the other hand, to reduced production costs, because the mutual influencing of the convergence channels is eliminated.

The object is also achieved by a method based on an optical measurement of the crosstalk of one convergence channel into the other convergence channel. The same advantages as with the prior method are achieved with this method. Moreover, it is possible using the optical measuring method also to take account during compensation of such forms of crosstalk which cannot be embodied in the form of a measurable electric voltage. This holds, for example, for stray magnetic fields which are distributed spatially such that although they influence the electron beam of a picture tube they do not cause any measurable induced voltage.

The method according to the invention can be carried out both with optical sensors which are arranged on the picture screen of the television receiver, and by means of an electronic camera.

Furthermore, it is an object of the present invention to provide an apparatus for improved convergence correction.

BRIEF DESCRIPTION OF THE DRAWINGS

The drawing is a schematic representation of a circuit with the aid of which the method according to the invention is explained. In the drawing.

DETAILED DESCRIPTION

Figure 1:
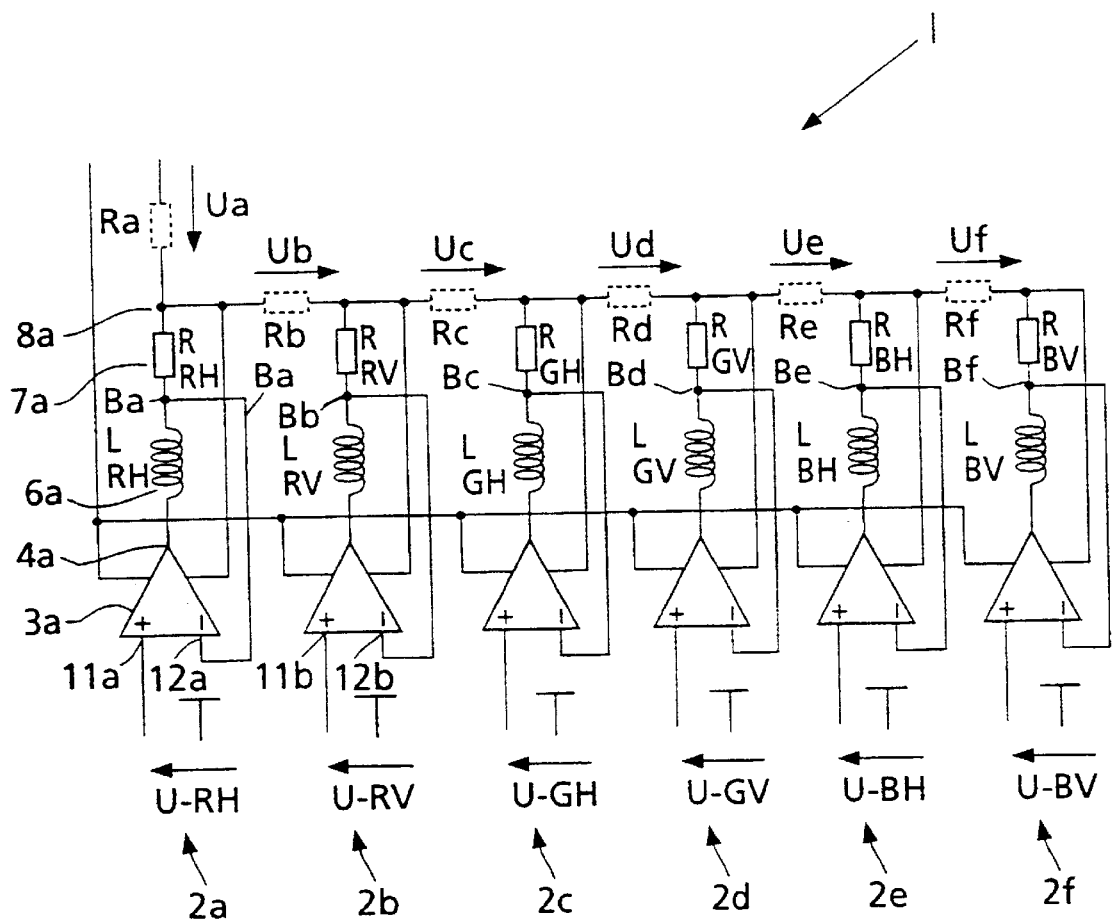
FIG. 1 shows a diagram of a circuit with six convergence channels of a projection television receiver.

A circuit denoted as a whole by 1 and which comprises six convergence channels 2a–2f is represented diagrammatically in FIG. 1. Each of the three monochromatic picture tubes of a projection receiver for the primary colours of red, green and blue are respectively assigned two convergence channels for setting the horizontal and vertical convergence. The convergence channels 2a–2f are of corresponding design, and so for the sake of brevity only the convergence channel 2a is described below as a representative for all convergence channels.

The convergence channel 2a comprises an output amplifier 3a whose output 4a is connected to a convergence coil 6a. With its second terminal, the convergence coil 6a is connected via a measuring shunt 7a to a frame terminal 8a of the circuit 1. The frame terminal 8a is connected to frame potential via a conductor track, the resistance of the conductor track being illustrated by the series resistor Ra illustrated with dashes. Of course, the magnitude of the resistance Ra is also influenced by other properties of the circuit 1, for example by contact resistances.

Connected to a first input 11a of the amplifier 3a is an input signal U-RH which generates in the convergence coil 6a a convergence current which brings about the horizontal convergence correction of the red picture tube. A second input 12a of the amplifier 3a is connected via a feedback loop 13a to a reference point Ba between the convergence coil 6a and the measuring shunt 7a. The amplifier 3a raises the convergence current until there is no longer any potential difference present between its inputs 11a and 12a, that is to say the feedback signal corresponds to the input signal U-RH.

In the present exemplary embodiment, the convergence values are stored as digital values which are converted into analogue output signals by means of A/D converters. However, it is also possible to implement the invention in a completely analogue circuit.

If, because of the input signal U-RH, a current of 1 A, for example flows in the convergence channel 2a, because of the voltage drop which caused by the convergence current in the series resistor Ra, a potential which is different from 0 V occurs at the frame terminal 8a. This voltage drop Ua leads to crosstalking into the other convergence channels, which becomes clear most simply from the following consideration: if the input signals U-RH to U-BV of all convergence channels 2a–2f are equal to 0 V, the respective convergence current is equal to 0 A in all convergence coils 6a–6f. While the input signals U-RV to U-BV of the convergence channels 2b–2f remain equal to 0 V, one input signal U-RH≠0 V is to generate a current of, eg 1 A, in the convergence channel 2. The voltage drop Ua is passed via the series resistor Rb and the measuring shunt 7b to the input 12b of the amplifier 3b of the convergence channel 2b. The potential difference at the input 11b and 12b of the amplifier 3b causes a current to be impressed on the convergence coil 6b although it holds for the input signal U-RV at the input 11b that: U-RV=0 V. This consideration can be carried over correspondingly to the other convergence channels 2c–2f.

It is therefore easy to see that the currents in the convergence channels 2b–2f depend on the intensity of the current in the convergence channel 2a. The electric crosstalk, described with the aid of the convergence channel 2a, between the individual convergence channels on the basis of an unavoidable series resistance which is connected downstream of the measuring shunt 7a, also holds in an entirely corresponding fashion for all other convergence channels 2b–2f, the further series resistances Rb–Rf then playing a role, as the case may be.

The situation, for example for the convergence channel 2b, can be formulated mathematically as follows. Without series resistances, it would hold that:

$$I_{(L\text{-}RV)} = U_{(U\text{-}RV)} / R_{(R\text{-}RV)} \quad (1)$$

The series resistances change this equation in such a way that it holds that:

$$I_{(LRV)} = (U_{(U\text{-}RV)} - Ua - Ub) / R_{(R\text{-}RV)} \quad (2)$$

Figure 2:
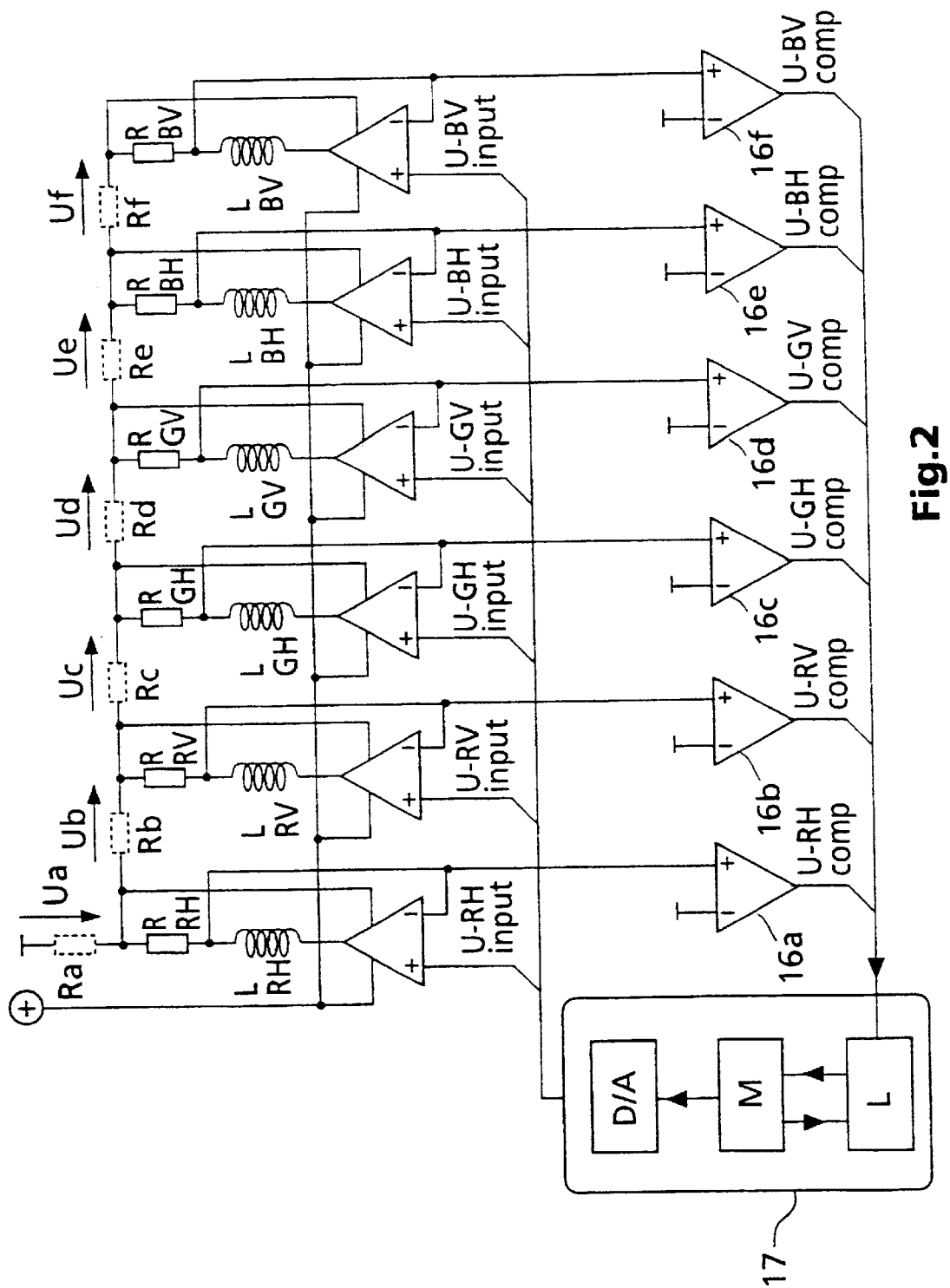
FIG. 2 shows the circuit of FIG. 1, which is supplemented by a comparitor for each convergence channel.

In the case of the circuit represented in FIG. 2, each convergence channel 2a–2f is extended by an additional comparator 16a–16f whose first input is connected to the feedback loop 13a–13f. The second input of the comparator 16a is connected to frame potential. The outputs of the comparators 16a–16f are connected to a convergence circuit 17 which has a memory M and computing means L. The output signals of the comparators 16a–16f, which compare the voltages at the reference points Ba . . . Bf with frame potential, are denoted by U-RH(comp) to U-BV(comp).

In order to be able to compensate the crosstalking of the individual convergence channels, the method described below is carried out at the start of convergence setting with a television receiver and after, as the case may be, existing offset voltages have been balanced. A method for balancing offset voltages is known, for example, from the German Patent Application with the file reference 42 14 317.9 from the same Applicant.

The first step is for the convergence circuit 17 to emit to the convergence channel 2a an output signal U-RH of, for example, 2 V, which causes a current of 1 A in the convergence coil 6a. The output signals U-RV, U-GH, U-GV, U-BH and U-BV emitted to the convergence channels 2b–2f are equal to 0 V in this case. The reference signal of the comparator 16b is now interrogated. If the comparator 16b emits a "1", the potential at the non-inverting input of the comparator is greater than 0 V. In this case, the convergence value, which determines the output signal U-RV in the convergence circuit 17 is decremented by one step. Thereafter, the reference signal of the comparator 16b is interrogated once again. This cycle is repeated until the reference signal of the comparator 16b changes from "1" to "0". The associated digital convergence value is then incremented again. As soon as the convergence circuit 17 establishes that the comparator 16b is exactly at its operating point, a progression is made to the next convergence channel and the output signal of the next comparator 16c is evaluated in the same way. In an entirely corresponding fashion, the digital convergence value is incremented by one step when the comparator emits a "0" at the start of the cycle. This happens until the reference signal changes from "0" to "1" and subsequently oscillates between "0" and "1". Such evaluation methods have already been described in the German Patent Applications with file references 42 14 317.9 and 198 01 968.8 of the same Applicant.

This cycle is repeated for all five convergence channels for which an output signal of 0 V is emitted at the start of the test mode. As soon as this first pass is concluded, the next convergence channel is driven by an output signal of, for example, 2 V, for example the convergence channel 2b. Once again, all other convergence channels 2a, 2c–2f are driven by an output signal of 0 V and subsequently balanced such that the associated comparitors 16a, 16c–16f are exactly at their operating point. This cycle is also repeated until all convergence channels have respectively alternately had a current applied to them once while the other convergence channels were balanced with respect to this one convergence channel.

This method supplies parameters which describe the crosstalk of each convergence channel onto the respective other convergence channels. By taking into account the parameters thus obtained in the case of the output signals for the individual convergence channels, it is possible to compensate crosstalking from one convergence channel to the others. The advantage of this is that from now on the setting of a specific convergence channel can be varied without this influencing the other convergence channels.

With reference to equation (2), the result of the compensation can be formulated such that:

$$U_{(U\text{-}RV)^*} = U_{(U\text{-}RV)} + Ua + Ub \quad (3)$$

$U_{(U\text{-}RV)}^*$ being the compensated input signal of the convergence channel 2b.

The described crosstalk based on a displacement of the reference potential of the convergence coils is denoted below for short as electric crosstalk. In addition to this electric crosstalk, there is, moreover, crosstalk which is transmitted by magnetically induced interference voltages from one convergence channel to another. This second form of crosstalk is denoted as magnetic crosstalk for short and occurs principally between the horizontal and the vertical convergence channels of the same picture tube, but is also present in principle between the convergence channels of different picture tubes. Furthermore, it is to be noted that the said interference voltages can be induced not only in the convergence coils, but also in parts of the convergence circuit. As regards the compensation of these interference voltages, the cause of the occurrence does not, however, play any role. Magnetic crosstalk can be compensated in the same way as electric crosstalk. However, because of the transient character of the induced interference voltages the evaluation of the comparators 16a–16f must be performed with adequate speed, but this does not present any difficulty in principle.

The described compensation of the crosstalk by means of electric measurements is carried out first and foremost at the manufacturers. Furthermore, it is also possible for the service engineer to carry out such a compensation routine after repairing the television receiver, in order to achieve the optimum convergence setting of the receiver.

In the case of receivers which are provided with optical measuring means, it is also possible to carry out the compensation of crosstalk on the basis of an optical measurement. For other receivers, this is possible at the manufacturers, at least. An optical measurement is certainly mostly relatively complicated, but has the advantage that all forms of crosstalk between the convergence channels are detected even when they cannot be detected in the form of a voltage which is measurable in the convergence channels. A further difference by comparison with the electric measurement is that the effect of the crosstalk on the deflection of the electron beam is detected directly without the need to assume a known relationship between a measured potential displacement and/or interference voltage and the deflection of an electron beam.

Figure 3:
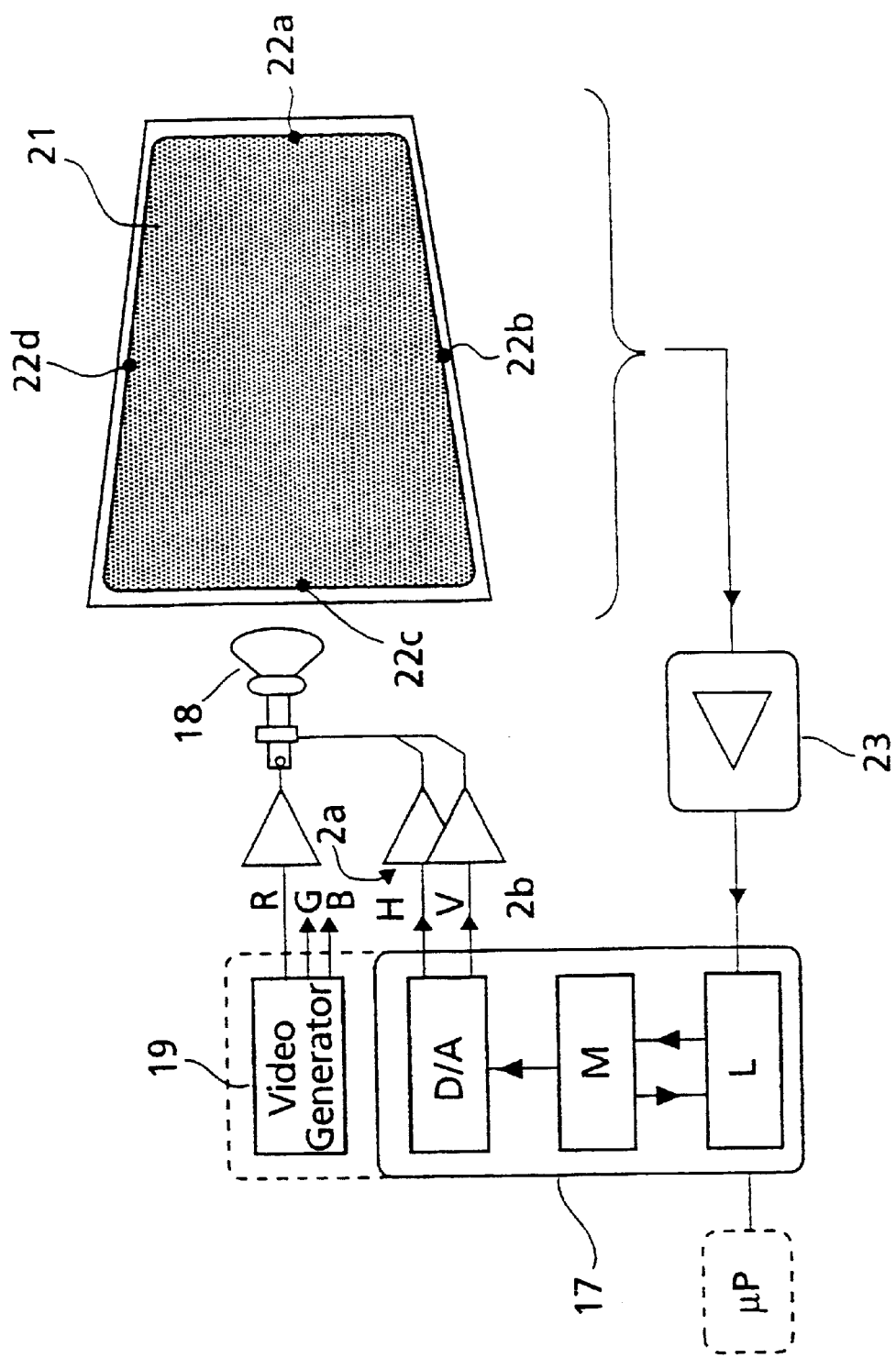
FIG. 3 shows a diagram of a projection television receiver.

Optical measurement is described below with the aid of FIG. 3. A video generator 19 supplies a three-component RGB video signal, the red component being fed to the picture tube 18. The video generator can also be integrated in the convergence circuit 17. For the sake of clarity, the other four convergence channels and two other monochromatic picture tubes, which are designed in an entirely corresponding fashion, are omitted.

The pictures of the red picture tube 18 and of the green and blue picture tubes (not represented) are projected onto a screen 21. Arranged on the screen 21 are four optical sensors 22a–22d which in each case are connected to an evaluation circuit 23 which is connected, for its part, to a logic circuit L of the convergence circuit 17. The logic circuit L can also cooperate with an internal or external microprocessor. Suitable optical sensors are disclosed, for example, in the German Patent Application with the file reference 197 00 204.8 of the same Applicant.

The optical measuring method functions as follows:

Only one colour, for example red, is emitted by the video generator 19. Furthermore, for example, a vertical cursor in the form of a red horizontal line is represented on the screen 21 and successively balanced such that, for example, the sensor 22a and the assigned evaluation circuit 23 are exactly at their response threshold. This is achieved by virtue of the fact that the convergence correction values stored in the memory M of the convergence circuit 17 are varied until the comparators assigned to the sensors 22a, 22c respond. The position thus determined corresponds to a desired position of the cursor, and the associated convergence value is stored in the memory M of the convergence circuit 17. This method is now repeated with a vertical red line to balance the horizontal convergence of the red picture tube 18, the sensors 22b, 22c serving to detect position. In this way, the convergence channels are sequentially balanced for horizontal and vertical convergence of all three picture tubes, and the associated convergence values, which are denoted as primary convergence values, are stored.

Starting from the convergence current which corresponds to the desired position determined, the convergence current is varied by a specific amount in a first convergence channel. Whereas the change in the convergence current in the first convergence channel is maintained, all other convergence channels are balanced once again such that the optical sensors and the assigned comparator stages 23 are at their operating points. The new convergence value found in this way is stored as a secondary convergence value. After this method has been carried out iteratively for all convergence channels, six measured values are to hand for each convergence channel: a primary convergence value and five further, secondary convergence values. The differences between the primary and the secondary convergence values specify a measure of the crosstalk of the other five convergence channels into this one convergence channel. Using these values, the output signals emitted by the convergence circuit 17 to the convergence channels are varied such that the crosstalk between the individual convergence channels is completely compensated in the optimum case.

Instead of the optical sensors, it is also possible to use an electronic camera to evaluate the position of a cursor on the picture screen 21. Such a method is described, for example, in the German Patent Application with the file reference 198 01 966.1 of the same Applicant.

What is claimed is:

1. Method for convergence correction in a color television display having a plurality of convergence channels, comprising the steps of:
   a) generating a predetermined current flow in a convergence coil of a first convergence channel;
   b) generating in all other convergence channels a zero signal causing substantially zero current in convergence coils of the other convergence channels;
   c) comparing, at a reference point in each convergence channel receiving the zero signal, a potential with a reference potential;
   d) forming at least one reference signal responsive to the comparisons in the convergence channels receiving the zero signal; and,
   e) coupling the at least one reference signal to control convergence correction.

2. The method of claim 1 comprising the step of:
repeating steps a)–e) sequentially for each convergence channel.

3. Method according to claim 2, comprising the step of:
converting the reference signals into digital reference values.

4. Method according to claim 2, comprising the step of:
storing the reference signals in the control circuit.

5. Method according to claim 2, comprising the step of:
adjusting, in accordance with respective reference signals, the zero signal for each convergence channel, to compensate for deviation of the potential at the reference point from the reference potential.

6. Method according to claim 3, comprising the step of:
adjusting, in accordance with respective reference values, the zero signal for each convergence channel, to compensate for deviation of the potential at the reference point from the reference potential.

7. Method according to claim 2, comprising the step of:
selecting frame potential as reference potential.

8. Method for adjusting convergence in a colour television receiver with a plurality of monochromatic picture tubes to which at least one convergence channel is assigned, the method comprising the following steps:
   a) imaging and adjusting a mark to a predetermined screen position by varying the relevant convergence current in a convergence channel assigned to a first picture tube;
   b) storing as a primary convergence value the convergence current in the convergence channel to produce the predetermined screen position;
   c) repeating steps a) and b) for all convergence channels of the same picture tube in order to adjust these convergence channels;
   d) repeating steps a) to c) are carried out sequentially for all picture tubes;

e) varying the primary convergence value, stored in a step b), of a first convergence channel is varied by a specific value;

f) after which adjusting a second convergence channel is rebalanced to the predetermined position of the respective mark;

g) storing the convergence value thus found for the second convergence channel as secondary convergence value to the first convergence channel;

h) deriving a crosstalk parameter which specifies a measure of the crosstalk of the first convergence channel into the second convergence channel from the difference between the primary convergence value and the secondary convergence value;

i) repeating steps f) to h) for all convergence channels except for the first convergence channel; and, j) repeating steps e) to i) in a corresponding way for all convergence channels.

9. Method according to claim 8, comprising the step of:

forming the difference between primary and secondary convergence values following storing of all secondary convergence values of all convergence channels.

10. Method according to claim 8, comprising the step of:

permutating the adjustment sequence of the convergence channels to determine the primary convergence value.

11. Method according to claim 8, comprising the step of:

according to crosstalk parameters the output signals to the convergence channels are varied such that crosstalk between the individual convergence channels is essentially compensated.

12. Method according to claim 8, comprising the step of:

setting the mark at the predetermined position by means of an optical sensor.

13. Method according to claim 8, comprising the step of:

setting the mark at the predetermined position by means of an electronic camera.

14. Apparatus for convergence correction in a colour television display having a plurality of convergence channels, comprising:

a control circuit emitting a test signal to a first convergence channel to impress on a convergence coil assigned thereto a current of predetermined intensity, while the control circuit emits to all the other convergence channels a zero signal which essentially corresponds to a substantially zero current in the assigned convergence coils, means for measuring a potential at a reference point of each convergence coil of those convergence channels which are driven by the zero signal, and for comparing the measured potential with a reference potential, means for generating a reference signal in each case for the relevant convergence channel representing the comparison between the measured potential and the reference potential; and means for coupling the reference signal to the control circuit.

* * * * *